(12) United States Patent
Morooka

(10) Patent No.: US 8,077,151 B2
(45) Date of Patent: Dec. 13, 2011

(54) INFORMATION PROCESSING APPARATUS

(75) Inventor: Hisao Morooka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 646 days.

(21) Appl. No.: 11/600,117

(22) Filed: Nov. 16, 2006

(65) Prior Publication Data
US 2008/0024436 A1 Jan. 31, 2008

(30) Foreign Application Priority Data

Jul. 31, 2006 (JP) ................................. 2006-208075

(51) Int. Cl.
G06F 3/02 (2006.01)
H05K 5/00 (2006.01)

(52) U.S. Cl. .............. 345/168; 361/679.02; 361/679.15; 345/156; 345/169

(58) Field of Classification Search .................. 345/156, 345/168–169; 361/600–602, 615–616, 679.01–679.3
See application file for complete search history.

(56) References Cited

U.S. PATENT DOCUMENTS

| 5,434,743 | A | * | 7/1995 | Hosoya et al. | 361/679.32 |
|---|---|---|---|---|---|
| 5,638,838 | A | * | 6/1997 | Lombardi | 132/294 |
| 6,108,716 | A | * | 8/2000 | Kimura et al. | 710/1 |
| 6,304,431 | B1 | * | 10/2001 | Kim | 361/679.09 |
| 6,654,234 | B2 | * | 11/2003 | Landry et al. | 361/679.27 |
| 6,903,927 | B2 | * | 6/2005 | Anlauff | 361/679.28 |
| 6,932,220 | B2 | * | 8/2005 | Byun | 206/581 |
| 7,120,462 | B2 | * | 10/2006 | Kumar | 455/556.1 |
| 2004/0155861 | A1 | * | 8/2004 | Jackson, III | 345/156 |
| 2005/0035950 | A1 | * | 2/2005 | Daniels | 345/169 |
| 2006/0075934 | A1 | * | 4/2006 | Ram | 108/44 |
| 2006/0152484 | A1 | * | 7/2006 | Rolus Borgward | 345/157 |

FOREIGN PATENT DOCUMENTS

| CN | 2609044 Y | 3/2004 |
|---|---|---|
| CN | 2665817 Y | 12/2004 |
| CN | 2687758 Y | 3/2005 |
| CN | 1719378 A | 1/2006 |
| CN | 1975624 A | 6/2007 |
| JP | 8-44458 | 2/1996 |
| JP | 2000-127588 | 5/2000 |
| JP | 2003-122447 A | 4/2003 |
| JP | 2004-094758 A | 3/2004 |
| JP | 2004-178540 | 6/2004 |

(Continued)

OTHER PUBLICATIONS

Chinese Office Action issued on Feb. 6, 2009 in corresponding Chinese Patent Application 200610163335.0.

(Continued)

Primary Examiner — Lun-Yi Lao
Assistant Examiner — Jarurat Suteerawongsa

(57) ABSTRACT

The information processing apparatus of the invention includes: a display section having a display screen on one surface thereof; a main unit that supports the display section so that the display section can open and close with the one surface arranged inside, and, when opened, serves as a base to erect the display section; and an input section that is physically detachably coupled to the main unit so as to be flush with the main unit. The input section has operating members for inputting information arrayed on a top surface thereof. The length of the sum of the input section and the main unit in a direction of the depth thereof when coupled is substantially same as the length of the display section in the same direction when closed.

8 Claims, 7 Drawing Sheets

FOREIGN PATENT DOCUMENTS

JP      2004-257513 A     9/2004

OTHER PUBLICATIONS

Japanese Notification of Reasons for Refusal, English-language translation, mailed Dec. 21, 2010 for corresponding Japanese Application No. 2006-208075.

"Chinese Office Action" mailed by CN Patent Office and corresponding to Chinese application No. 201010220388.8 on Feb. 22, 2011, with English translation.

"Japanese Office Action" mailed by JPO and corresponding to Japanese application No. 2006-208075 on Mar. 15, 2011, with English translation.

\* cited by examiner

INFORMATION PROCESSING APPARATUS

CROSS REFERENCE TO RELATED APPLICATIONS

This application claims the benefit under 35 U.S.C. Section 119 of Japanese Patent Application No. 2006-208075, filed Jul. 31, 2006, which is hereby incorporated by reference in its entirety into this application.

BACKGROUND OF THE INVENTION

1. Field of the Invention

The present invention relates to an information processing apparatus that performs information processing in a computer and the like.

2. Description of the Related Art

Typically, a display apparatus (hereafter referred to as "display") is used to display information in working with a computer.

There are various types of computers, including a desktop computer in which a display is separated from a main unit, and a notebook (laptop) computer in which a display unit is connected by a hinge to a main unit that a keyboard is disposed on.

As such a desktop computer is stationary or installed at a fixed place, it does not need to be so compact, and rather needs a large screen to display information as much as possible for efficient work.

On the other hand, a notebook computer is favored by an office worker as it is convenient to carry, because of reduction in size when not in use by closing a display section to be overlapped on a main unit, and because of being an integrated apparatus that does not require other device to perform data processing. However, emphasis on transportability results in reduction in size of a display section as a computer is miniaturized, leading to deterioration in work efficiency.

Additionally, there is the demand for further transportability of a computer, due to the business trend where a conference using sophisticated wireless network inside a company is encouraged and a worker is not given a fixed seat in the office any more.

When a worker moves with a computer in a company, he or she always carries documents and stationery together. In this regard, for example, Japanese Patent Laid-Open No. 08-044458 discloses the computer provided with a tray to be pulled out so as to enhance its transportability.

However, the conventional computers have the following problems in terms of improving compactness and transportability: (1) a desktop computer lacks in portability as it is composed of a display, a main unit and a keyboard that are relatively large and disposed separately; (2) a notebook computer has excellent portability, but is inconvenient for carrying other articles together; (3) the computer disclosed in Japanese Patent Laid-Open No. 08-044458 has transportability by keeping articles in the tray provided in the main unit thereof, but requires widening the thickness of its main unit, which makes the computer large.

SUMMARY OF THE INVENTION

The present invention has been made in view of the above circumstances, and provides an information processing apparatus that has excellent transportability as well as the layout easy to handle when in use.

A first information processing apparatus according to the invention includes:

a display section having a display screen on one surface thereof;

a main unit that supports the display section so that the display section is capable of opening and closing with the one surface arranged inside, and, when opened, serves as a base to erect the display section; and an input section that is physically detachably coupled to the main unit so as to be flush with the main unit and has operating members for inputting information arrayed on a top surface thereof, the input section being positioned in front of the main unit when detached, the length of the input section and the main unit, in a direction of the depth of the input section and the main unit when coupled, being substantially same as the length of the display section in the same direction when closed.

According to the first information processing apparatus of the invention, the input section provided with the operating members for inputting information is detachable from the main unit, and thus the input section can be moved to be placed in a position convenient for a user to handle. Accordingly, the layout of the PC easy to handle by a user when in use can be achieved.

Additionally, the input section of the first information processing apparatus can be coupled to the main unit so as to be flush with the main unit. At the same time, the length of the display section in a direction of the depth thereof is substantially equal to the length of the sum of the input unit and the main unit that are connected with each other. Accordingly, after the input section is coupled to the main unit and the display section is closed, the first information processing apparatus is easy to carry with enhanced transportability.

Preferably, in the first information processing apparatus, the display section includes a back surface that is opposite to the one surface and is shaped like a tray with raised edges on the periphery thereof.

As the back surface of the display section is configured to have raised edges formed on the periphery thereof and is shaped like a tray, it is possible to carry articles such as documents and stationery placed on the back surface. Accordingly, transportability is enhanced.

More preferably, in the first information processing apparatus, the main unit and the input section each have a connecting portion for connection therebetween that is disposed in a flank of a front side of the main unit and a flank of a back side of the input section respectively.

Coupling the input section to the main unit through the connecting portions provides integrity and convenience at the time of carrying and using the apparatus.

It is also possible in the first information processing apparatus that the display section further has a claw that is arranged, by closing the display section, to be positioned on a flank of a front side of the input section coupled to the main unit, thereby preventing detachment of the input section from the main unit.

By providing the claw, detachment of the input section from the main unit can be prevented even when the apparatus is carried with the flank of the front side positioned in a downward direction.

Further in the first information processing apparatus, the main unit may have a handle that is disposed on a flank of a back side of the main unit and is used to lift the information processing apparatus by holding the handle with a hand.

By providing the handle, it is possible to lift and carry the apparatus with a single hand.

Additionally, the first information processing apparatus may have a supporting member whose one end supports a back surface opposite to the display section so that the display section is capable of rotating, and whose other end is rotatably supported by the main unit, wherein the main unit supports, via the supporting member, the display section so that the display section is capable of opening and closing.

By providing the supporting member, the display section is supported as good as a desktop computer, so that the display screen is easy to be seen when used.

Preferably, the supporting member is configured such that the one end of the supporting member supports, by friction thereof, the display section at any angle within the rotation angle of the display section, while the other end of the supporting member maintains, by friction thereof, an angle of the supporting member relative to the main unit at any angle within the rotation angle of the supporting member.

By maintaining the supporting member by friction so as to be set at any angle, the display section can be adjusted to be in desirable height and angle so as to be easily seen by a user.

Further, in the first information processing apparatus, the input section may be a wireless keyboard that wirelessly transmits information input through the operating members to the main unit.

Provision of the wireless keyboard eliminates the need to provide an electrical cord, leading to a more user-friendly apparatus.

Additionally, a second information processing apparatus includes:

a display section having a display screen on one surface thereof;

a main unit having a supporting member whose one end supports a back surface opposite to the one surface of the display section so that the display section is capable of rotating, and whose other end is rotatably supported by the main unit, thereby the main unit supporting via the supporting member the display section so that the display section is capable of opening and closing and, when opened, serving as a base to erect the display section; and an input section that is integrated with the main unit so as to be flush with the main unit and has operating members for inputting information arrayed on a top surface thereof.

The second information processing apparatus has the supporting member irrespective of whether the input section is detachable from the main unit. Thus, the display section is supported as good as a desktop computer, so that the display screen can be adjusted to be easily seen by a user. Additionally, by closing the display section to be overlapped over the main unit and the input section, the apparatus is easy to carry.

Preferably in the second information processing apparatus, the one end of the supporting member supports, by friction thereof, the display section at any angle within the rotation angle of the display section, while the other end of the supporting member maintains, by friction thereof, an angle of the supporting member relative to the main unit at any angle within the rotation angle of the supporting member.

By maintaining the supporting member by friction so as to be set at any angle, the display section can be adjusted to be in desirable height and angle so as to be easily seen by a user.

Further, in the second information processing apparatus, the embodiment similar to the first information processing apparatus is also applied.

As described above, the present invention can realize the information processing apparatus that has excellent transportability as well as the layout easy to handle when in use.

DETAILED DESCRIPTION OF THE INVENTION

Embodiment(s) of the present invention will be described below with reference to the attached drawings.

Figure 1:
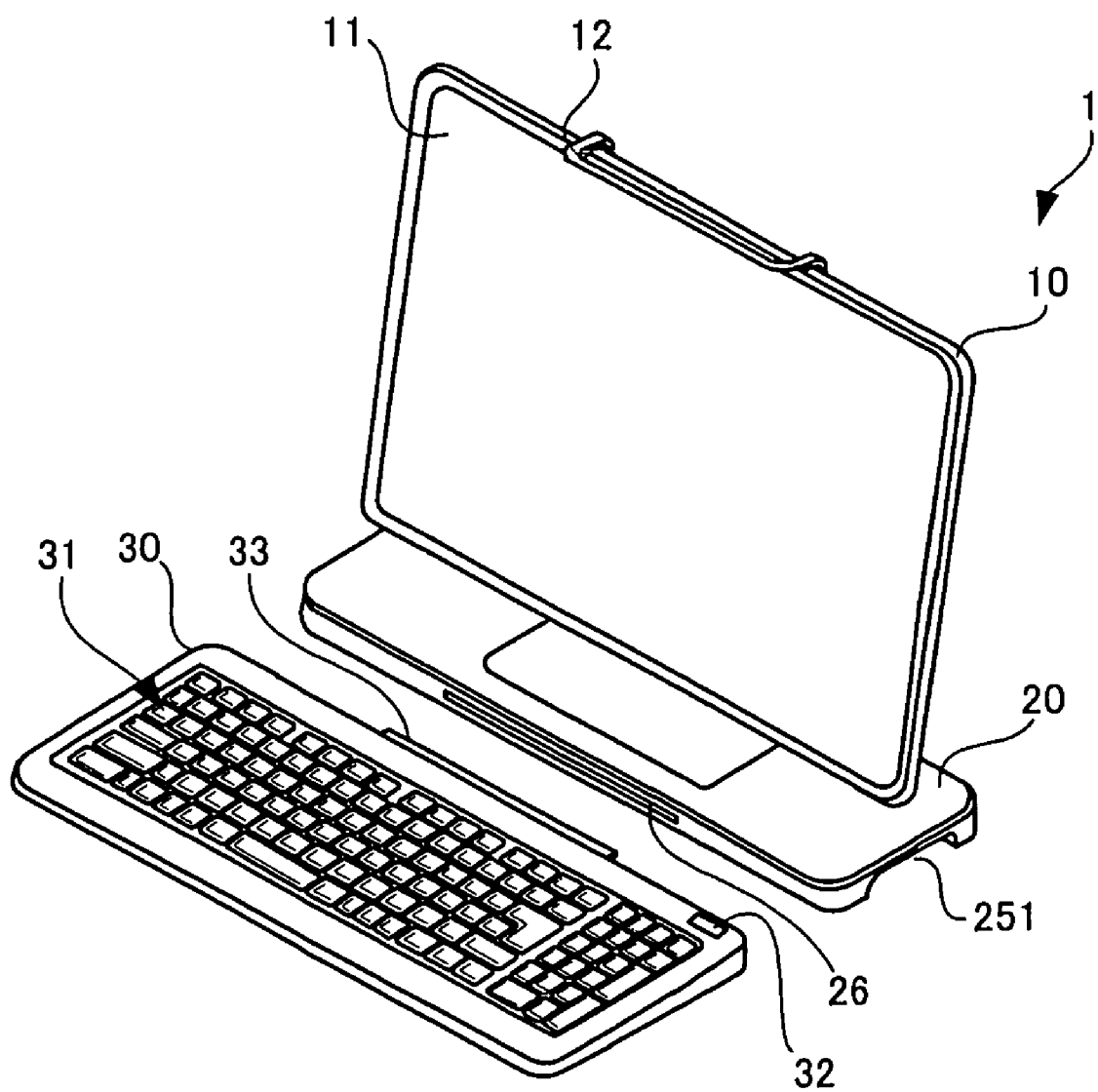
FIG. 1 is a perspective view of a personal computer (hereafter referred to as PC) when opened according to one embodiment of the invention.

FIG. 1 is a perspective view of a personal computer 1 (hereafter referred to as PC) when opened according to one embodiment of the invention.

Figure 2:
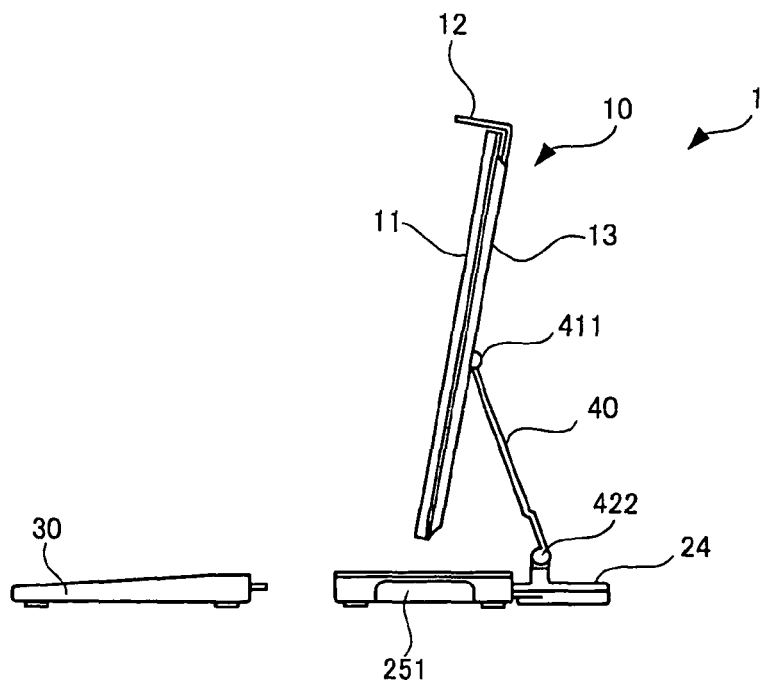
FIG. 2 is a right-side view of the PC shown in FIG. 1, when opened.
Figure 3:
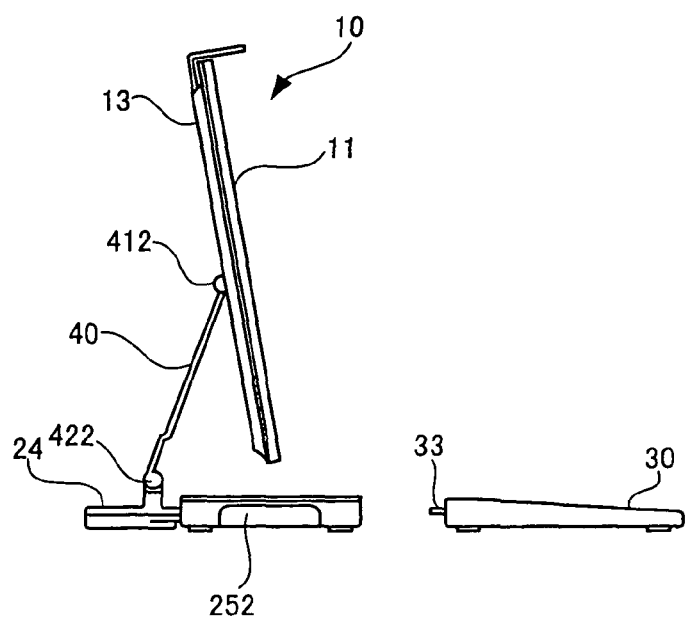
FIG. 3 is a left-side view of the PC shown in FIG. 1, when opened.
Figure 4:
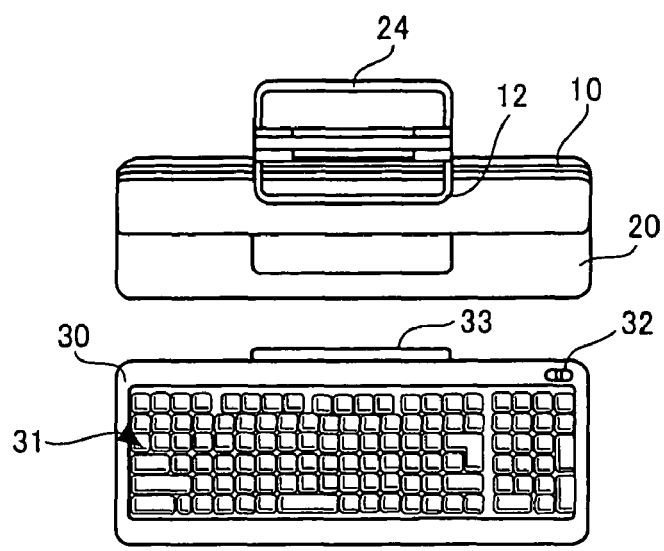
FIG. 4 is a top view of the PC, when opened, shown in FIG. 1.
Figure 5:
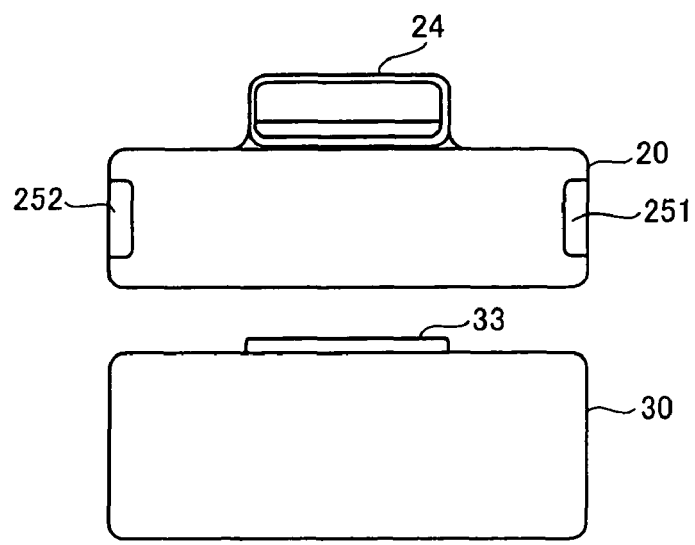
FIG. 5 is a bottom view of the PC shown in FIG. 1, when opened.
Figure 6:
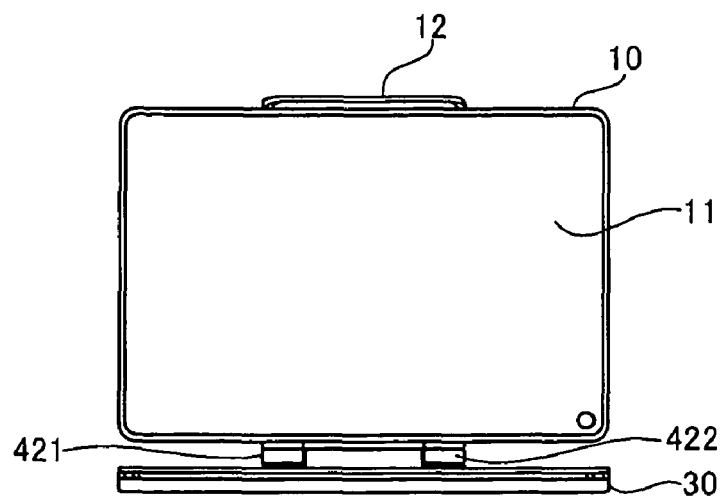
FIG. 6 is a front view of the PC shown in FIG. 1, when opened.
Figure 7:
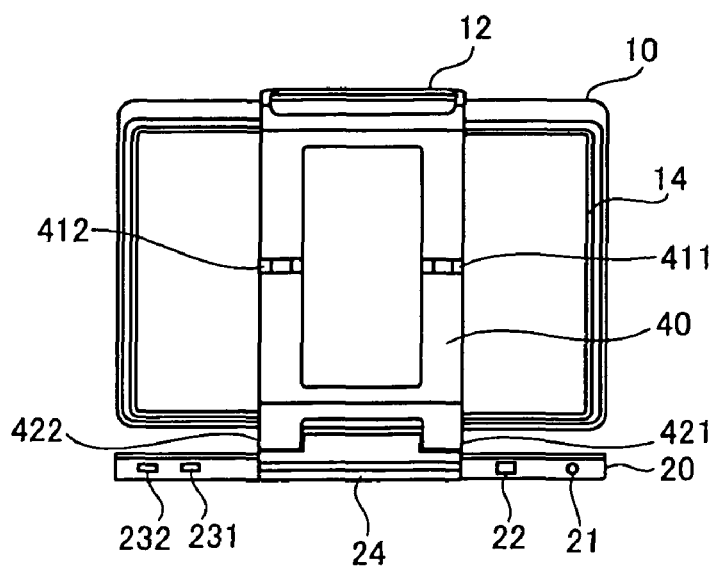
FIG. 7 is a back view of the PC shown in FIG. 1, when opened.

FIG. 2 and FIG. 3 are respectively a right-side view and a left-side view of the PC, when opened, shown in FIG. 1. FIG. 4 and FIG. 5 are respectively a top view and a bottom view of the same, and FIG. 6 and FIG. 7 are respectively a front view and a back view of the same.

Figure 8:
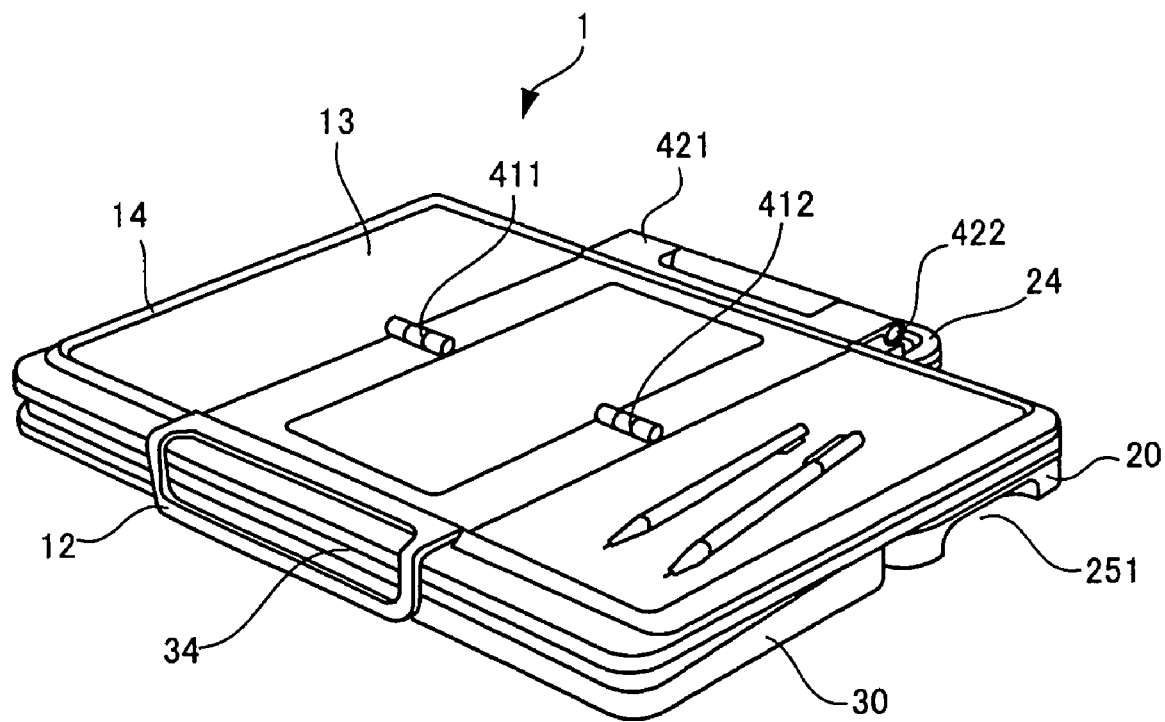
FIG. 8 is a perspective view of the PC shown in FIGS. 1 through 7, when closed.

FIG. 8 is a perspective view of the PC when closed shown in FIG. 1 through FIG. 7.

Figure 9:
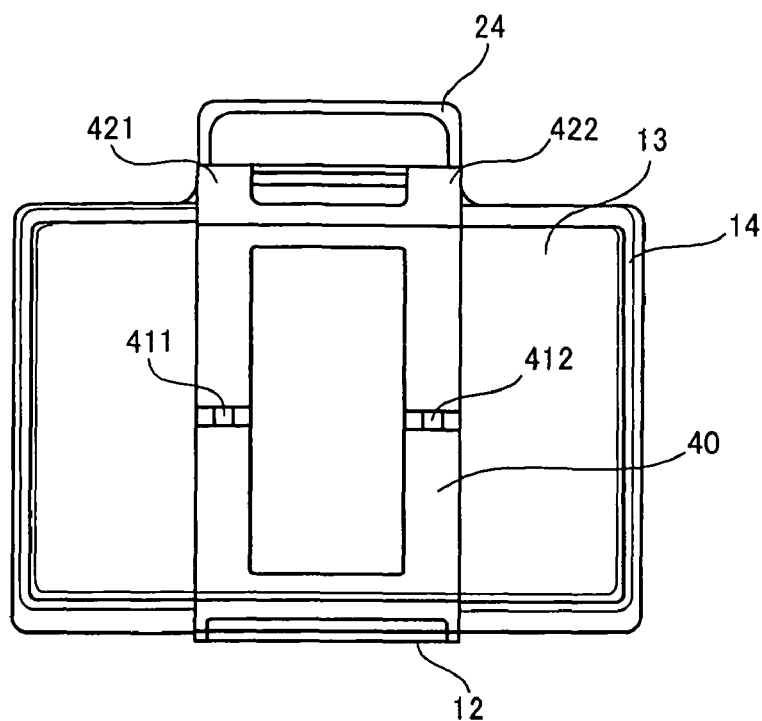
FIG. 9 is a top view of the PC shown in FIG. 8, when closed.
Figure 10:
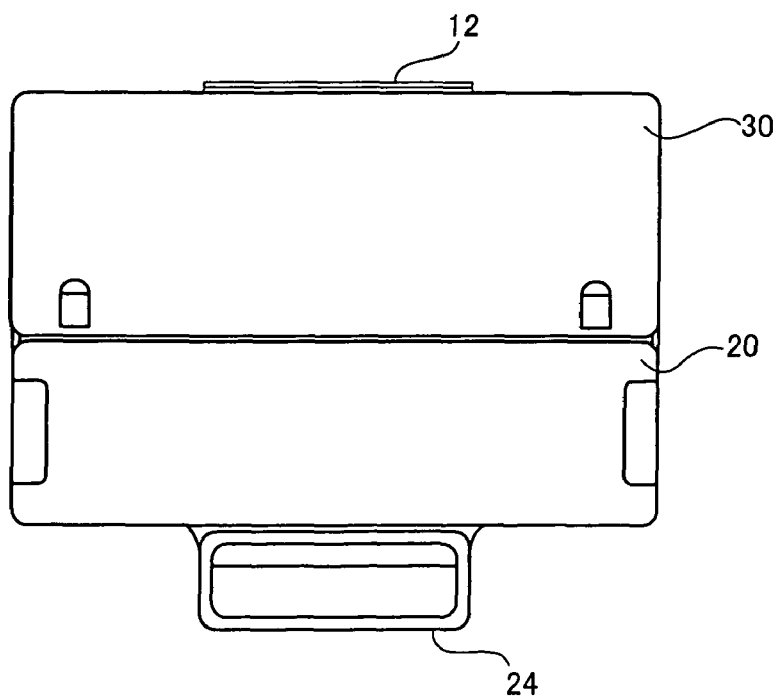
FIG. 10 is a bottom view of the PC shown in FIG. 8, when closed.

FIG. 9 and FIG. 10 are respectively a top view and a bottom view of the PC when closed shown in FIG. 8.

FIG. 10 is a bottom view of the PC shown in FIG. 8, when closed.

The PC 1 of FIG. 1 is composed of a display section 10, a main unit 20, and an input section 30.

The display section 10 has a display screen 11, which covers nearly the whole of the surface of the display section 10, and displays an image on the display screen 11 in response to an instruction from the main unit 20.

Additionally, the display section 10 has a claw 12 configured to be positioned at the upper end of the PC 1 when opened, and positioned on the flank of the front side of the PC 1 when closed. The details of the claw 12 will be described later.

The main unit 20 serves as a base to erect the display section 10 when opened as well as holds the display section 10 in such a way that the display section 10 can be opened and closed with the surface of the display screen 11 arranged in the front side of the display section 10. In the embodiment, the display section 10 is supported via a supporting member 40 by the main unit 20 so as to be opened and closed.

More particularly, a back surface 13 of the display section 10 is rotatably held by one end of the supporting member 40 via hinges 411 and 412, while the other end of the supporting member 40 is rotatably held by the main unit 20 via hinges 421, 422.

The hinges 411, 412 disposed at the display section 10 holds the display section 10, by their friction, at any angle within the rotation range of the display section 10, while the hinges 421, 422 are rotatably held by their friction at any angle within the rotation range thereof by the main unit 20. Accordingly, the main unit 20 is capable of supporting the display section 10 via the supporting member 40 so that the display section may be kept in a position of any height and angle within the rotation range relative to the main body 20.

Although the main unit 20 performs data processing by a CPU and the like incorporated therein, the PC 1 in the embodiment is a thin client computer and thus does not have a large-capacity memory device such as a magnetic disc installed therein. However, the invention is not limited to a thin client computer, and may be applied to other types of PCs having a hard disc device and the like installed therein.

Figure 11:
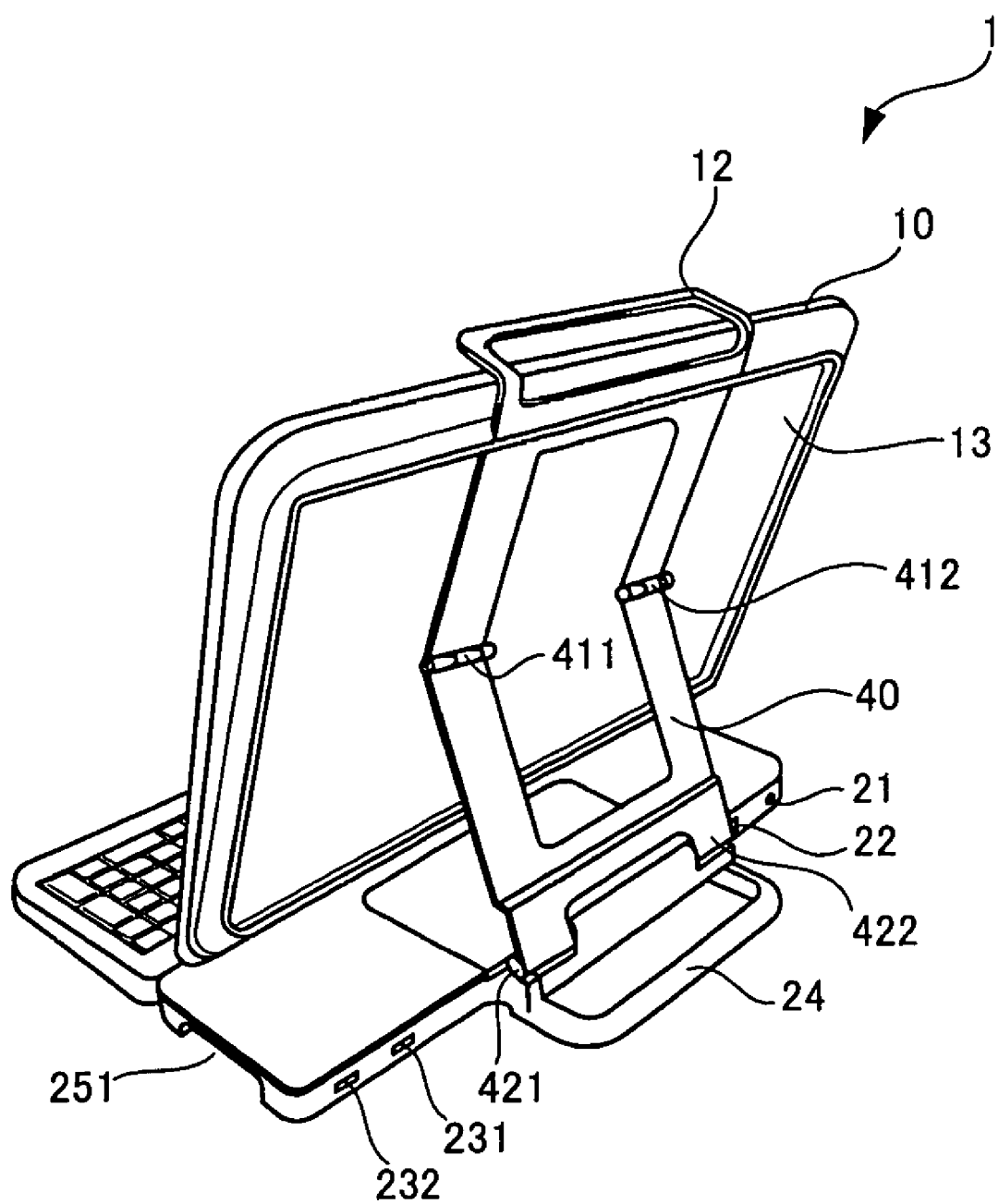
FIG. 11 is a perspective view of the PC shown in FIG. 1, when opened, as viewed obliquely from the back side thereof.

As shown in FIG. 11, the main unit 20 in the embodiment has, on the flank of the back side thereof, various connecting portions, including an AC adapter connecting portion 21 to receive an AC adapter, a LAN connector connecting portion 22 to receive a LAN (Local Area Network) connector, and two USB connector connecting portions 231, 232 to receive a USB (Universal Serial Bus) connector respectively. Also on the flank of the back side of the main unit 20, there are a handle 24 to lift the PC 1 with a hand. Additionally, on the flanks of the right and left sides of the main unit 20, there are recesses 251, 252 to place fingers therein when lifting the PC 1. Further, a connecting portion 26 to receive the input section 30 is disposed on the flank of the front side of the main unit 20.

On the top surface of the input section 30, arrayed are plural keys 31 for inputting information that is wirelessly transmitted to the main unit 20. Near the right corner of the top surface of the input section 30, a fingerprint sensor 32 is disposed for use in authentication. Further, a connecting portion 33 to be coupled to the connecting portion 26 is disposed on the flank of the back side of the input section 30.

The input section 30 is configured to be detachably connected to the main unit 20. In other words, the input section 30 is capable of being detached from the main unit 20 as shown in FIG. 1 as well as being connected to the main unit 20 as shown in FIG. 11, by making the connecting portion 33 of the input section 30 coupled to the connecting portion 26 of the main unit 20. With the input section 30 coupled to the main unit 20 and the display section closed, the PC 1 has such a configuration, as shown in FIG. 8, that the length of the display section 10 in a direction of the depth of the display section, that is, from the front side to the back side thereof, is substantially same as the sum of the length of the main unit 20 and the input section 30 in the same direction.

When the PC 1 is carried, the input section 30 is coupled to the main unit 20 as shown in FIG. 8 and the display section 10 is closed to be overlaid on the input section 30 and the main unit 20 that are connected with each other. The embodiment assumes the following two ways of carrying the PC 1.

One way is to lift the PC 1 with hands, by placing fingers in the recesses 251 and 252, with the back surface 13 of the display section 10 positioned at the top and the front end of the front side of the display section positioned in front of a user. This way is suitable for carrying the PC 1 in a relatively short range, for example, within a room, or, to an adjacent room.

The back surface 13 of the display section 10 has, as shown in FIG. 8, raised edges 14, and thus the whole of the back surface 13 is shaped like a tray. Accordingly, it is possible to prevent falling of articles such as documents and stationery placed on the back surface 13 when carried together with the PC 1.

The other way is to hold the handle 24 with a hand, with the PC 1 positioned vertical. This way is suitable for carrying the PC 1 in a relatively long range.

When the display section 10 is closed after the input section 30 being coupled to the main unit 20, the claw 12 is positioned on a flank 34 of the front side of the input section 30 so as to push and hold the flank 34. Accordingly, it is possible to prevent detachment of the input section 30, due to disengagement of the connection portion 33 of the input section 30 from the connection portion 26 of the main unit, even when the PC 1 is lifted to be carried by holding the handle 24 with a hand. Thus, safe transportation of the PC 1 is ensured.

What is claimed is:

1. An information processing apparatus comprising:
a display section having a display screen on one surface thereof;
a main unit that supports the display section so that the display section is capable of opening and closing with the one surface arranged inside, and, when opened, serves as a base to erect the display section, and that includes an upper surface which faces the one surface of the display section when the display section is closed;
a supporting member whose one end supports a back surface of the display section at a middle portion of the back surface, the back surface being opposite to the one surface of the display screen so that the display section is capable of rotating, and whose other end is rotatably supported by the main unit; and
an input section that is operably coupled to the main unit and physically detachable frontward from the main unit, and has operating members for inputting information arrayed on a top surface thereof, wherein a total length, in a depth direction of the input section and the main unit, of a length of the input section and a length of the main unit in a connected state is substantially equal to a length of the display section in a depth direction of the display section when the display section is closed, and the top surface of the input section on which the operating members are arrayed is a surface that is flush with the upper surface of the main unit when the input section is attached to the main unit,
wherein the display section has a back surface that is opposite to the one surface, is shaped like a tray with a raised edge entirely along the periphery thereof and has no electronic component arranged thereon, and
wherein the main unit supports, via the supporting member, the display section so that the display section is capable of opening and closing.

2. The information processing apparatus according to claim 1, wherein the main unit and the input section each have a connecting portion for connection therebetween that is disposed in a flank of a front side of the main unit and a flank of a back side of the input section.

3. The information processing apparatus according to claim 1, wherein the display section further has a claw that is arranged, by closing the display section, to be positioned on a flank of a front side of the input section coupled to the main unit, thereby preventing detachment of the input section from the main unit.

4. The information processing apparatus according to claim 1, wherein the main unit has a handle that is disposed on a flank of a back side of the main unit and is used to lift the information processing apparatus by holding the handle with a hand.

5. The information processing apparatus according to claim 1, wherein the one end of the supporting member supports, by friction thereof, the display section at any angle within the rotation angle of the display section, while the other end of the supporting member maintains, by friction thereof, an angle of the supporting member relative to the main unit at any angle within the rotation angle of the supporting member.

6. The information processing apparatus according to claim 1, wherein the input section is a wireless keyboard that wirelessly transmits information input through the operating members to the main unit.

7. An information processing apparatus comprising:
a display section having a display screen on one surface thereof;
a main unit having a supporting member whose one end supports a back surface at a middle portion thereof, the back surface being opposite to the one surface of the display section so that the display section is capable of rotating, and whose other end is rotatably supported by the main unit, thereby the main unit supporting via the supporting member the display section so that the display section is capable of opening and closing and, when opened, serving as a base to erect the display section, and that includes an upper surface which faces the one surface of the display section when the display section is closed; and
an input section that is operably coupled to the main unit and physically detachable frontward from the main unit, and has operating members for inputting information arrayed on a top surface thereof, wherein a total length, in a depth direction of the input section and the main unit, of a length of the input section and a length of the main unit in a connected state is substantially equal to a length of the display section in a depth direction of the display section when the display section is closed, and the top surface of the input section on which the operating members are arrayed is a surface that is flush with the upper surface of the main unit when the input section is attached to the main unit,
wherein the display section has a back surface that is opposite to the one surface, is shaped like a tray with a raised edge entirely along the periphery thereof and has no electronic component arranged thereon.

8. The information processing apparatus according to claim 7, wherein the one end of the supporting member supports, by friction thereof, the display section at any angle within the rotation angle of the display section, while the other end of the supporting member maintains, by friction thereof, an angle of the supporting member relative to the main unit at any angle within the rotation angle of the supporting member.

* * * * *